Patented Feb. 2, 1954

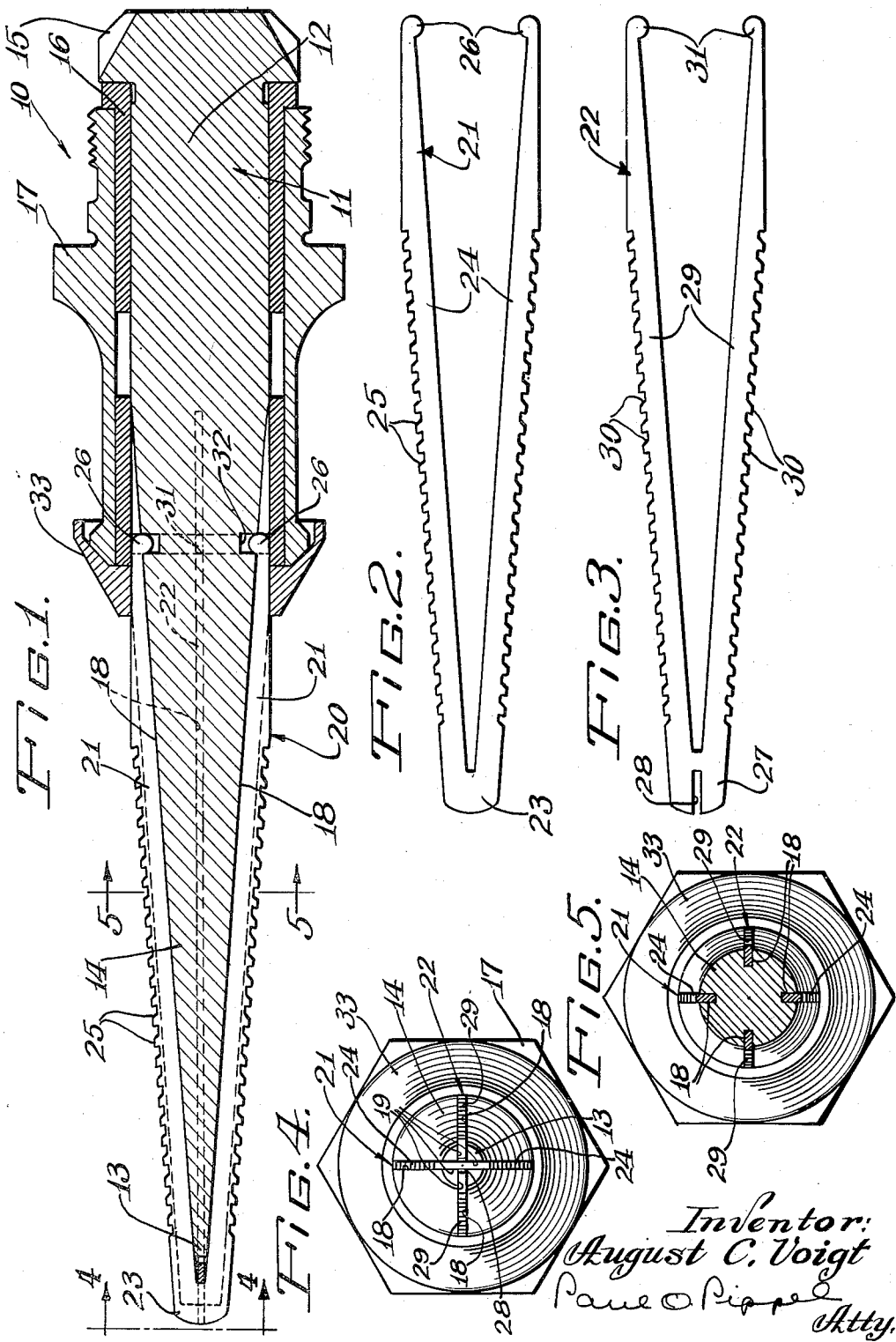

2,667,725

UNITED STATES PATENT OFFICE 2,667,725

COTTON PICKER SPINDLE ASSEMBLY WITH INSERTS

August Christian Voigt, Evergreen Park, Ill., assignor to International Harvester Company, a corporation of New Jersey Application June 13, 1951, Serial No. 231,372

9 Claims. (Cl. 56—50)

This invention relates to an improved cotton picker spindle assembly. More specifically, the invention relates to an improvement in inserts adapted to be assembled with cotton picker spindles.

In the type of cotton picker machinery to which the present invention relates, the picking mechanism usually consists of a pair of picker drums which are so positioned that the cotton plants pass between the drums as the unit moves through the field. The drums are provided with a plurality of rotating spindles which contain barbed projections for engaging the cotton bolls.

In practice, it has been discovered that the barbs become quickly dulled in view of the thick vegetation on which they must operate. Thus frequent resharpening is a necessary part of maintenance and it has been found to be exceedingly expensive since the spindles have to be disassembled in the field and must be individually replaced. Generally, the task of removing the spindles and replacing them is tantamount to a complete overhauling of the unit. It is therefore a prime object of the invention to provide an improved cotton picker spindle having a plurality of quickly replaceable inserts which can be replaced under field conditions.

Still another object is to provide a cotton picker spindle having a plurality of axially extending slots adapted to receive relatively thin sheet metal inserts which can be quickly replaced.

A still further object is to provide an insert assembly for cotton picker spindles, the assembly including a plurality of barbed leg members which extend in diverging relation from a common connecting point, the inserts being adapted to be assembled in the slots of a cotton picker spindle.

Still another object is to provide a cotton picker spindle insert having a tip portion and a pair of leg members extending from the tip portion in diverging relation, the leg members having barbs positioned thereon and being adapted to connect within the slots of a conical spindle.

A still further object is the provision of a cotton picker spindle insert assembly consisting of a plurality of relatively thin metal members shaped in V-formation, the members including connecting projections extending inwardly and being adapted to engage a recessed portion of a cotton picker spindle.

These and further objects will become more readily apparent upon a reading of the specification when examined in connection with the accompanying sheet of drawing.

In the drawing:

Figure 1 is a longitudinal cross-sectional view of a cotton picker spindle having an improved insert assembly connected thereto, the spindle being mounted for rotation in a bearing collar.

Figure 2 is an elevational view in detail of a spindle insert.

Figure 3 is a detail view, in elevation, of a spindle insert adapted to be assembled with the insert shown in Figure 2 to provide an insert assembly.

Figure 4 is an end view of the cotton picker spindle assembly taken along the line 4—4 of Figure 1.

Figure 5 is a cross-sectional view through a cotton picker assembly, the view being taken substantially along the line 5—5 of Figure 1.

Referring particularly to Figure 1, a spindle assembly is generally designated by the reference character 10. The spindle assembly 10 includes a spindle 11 having at one end a journal portion 12 and at its other end a tip portion 13. An insert holding portion or body 14 is disposed between the journal portion 12 and the tip portion 13. The end of the journal portion 12 is provided with a pinion or drive member 15, this member being driven by a conventional type of gear mechanism in a cotton picker drum (not shown).

The journal portion 12 is adapted to rotate in a bearing sleeve 16 which is rigidly secured to a cylindrical collar 17 adapted to connect to the structure of a picker drum.

The insert holding portion 14 is provided with a plurality of circumferentially spaced axially extending slots 18. As shown, the insert holding portion or body 14 is of conical form, this shape being conventional. The axially extending slots 18 are coextensive with the insert holding portion 14 and terminate in the tip portion 13, as best shown in Figs. 1 and 4, in cruciform relation as indicated at 19.

A cotton picker insert assembly is generally designated at 20, this assembly being connected to the insert holding portion 14 of the spindle 11. The insert assembly includes inserts generally designated at 21 and 22. As best shown in Figure 2, the insert 21 is provided with a tip portion 23 at a first end connecting a pair of legs 24. The legs 24 are formed of relatively thin sheet material and extend from the tip 23 in a V-shape or diverging relation. The legs 24 are provided at their outer edge portions with serrations 25 which, in effect, are barbs or picking members as indicated projecting outwardly of the slots 18 for engaging the lobes or bolls of cotton. The legs 24 are provided at a second end of the insert 21 with inwardly extending projecting portions 26, the purpose of which will presently appear. The insert 22 is provided at a first end with a tip 27 formed with a longitudinally extending slot 28. Legs 29 are connected to the tip 27, the legs also extending longitudinally in diverging or V-shape formation similar to the legs 24 of the insert 21. The extension of the legs may also be termed as being substantially of U-shape or hairpin shape. The legs 29 have outer edge portions which are also provided with serrations or barbs 30 similar to the barbs 25. The legs 24 and 29 have their inner edges supported in the slots 18 in mating relation as indicated in Figures 1, 4, and 5. The legs 29 also are provided at a second end of the insert 22 with inwardly extending projecting portions 31. As shown in Figure 1, the projections 26 and 31 are in mating relation with an annularly extending recess 32 formed in the insert holding portion 14 of the spindle 11. A collar 33 encircles the spindle 11, the collar 33 being effective in conjunction with the cylindrical collar 17 to secure the leg members 24 and 29 of the inserts 21 and 22, respectively, in the slots 18.

During fabrication, the inserts 21 and 22 may be quite readily made of thin sheet material and thus may be stamped out by a suitable die mechanism. The serrations 25 and 30 may also be formed in this manner and may subsequently be sharpened or shaped in the manner desired. By this method, the inserts may be very inexpensively made and can be discarded after they have become worn. They may be readily assembled and disassembled with respect to the spindle by the operator in the field and the tedious and time consuming operation of removing the complete spindle is avoided. During assembly, the tip portion 23 of the spindle 21 may be positioned in such a manner that the portion 23 slides into the slot 28 of the insert 29 in cruciform relation as best shown in Figure 4. An assembly is thus provided whereby the individual inserts may be held against relative turning movement and they are properly alined for assembly with the circumferentially disposed slots 18 in the spindle 11. Supposing now that the cylindrical collar 17 has been removed from the spindle 11, the insert assembly can be easily and quickly assembled with the inner edges, or edge portions, of the legs 24 and 29 mating with the slots 18 until the projecting members 26 and 31 fall into the annular recess 32. The inserts are now in the position shown in Figure 1 wherein the projecting barbs or serrations 25 and 30 project outwardly of the slots 18. The collar 17 is thereupon replaced and the collar 33 is also assembled in place, whereupon the leg members 24 and 29 are securely held within the slots and the assembly is again ready for operation. To replace the worn inserts, it is a simple matter to remove the collars 17 and 33 without removing the spindle 11 from the picker drum.

It can now be seen that an improved insert assembly has been provided which fully achieves the objects of the invention. Inserts of this type are simple to manufacture and therefore are inexpensive in construction. The inserts can be readily and quickly replaced in the field without the necessity of resharpening the spindles since the inserts are expendable.

It must be understood that changes or modifications may be made in this construction which do not depart from the spirit of the invention as disclosed nor the scope thereof as defined in the appended claims.

What is claimed is:

1. A picker spindle structure comprising in combination, a spindle having a journal portion, a tip portion and an insert holding portion disposed between the journal portion and the tip portion, said insert holding portion comprising a conical body, said body and said tip portion being provided with a plurality of axially extending slots, the slots terminating in the tip portion in cruciform relation, a picker insert assembly supported on the insert holding portion, said assembly comprising a plurality of relatively thin inserts having first end portions connected adjacent the tip portion in cruciform relation and second end portions, the inserts extending in diverging relation and conforming to the conical body, said inserts including inner edge portions disposed in the axially extending slots and outer edge portions including picker barbs projecting outwardly from the conical body, inwardly extending projections disposed on second end portions of the inserts, said conical body including a recessed portion for receiving the inwardly extending projections, and a collar disposed over the conical body, said collar engaging the inserts for securing them against axial and lateral displacement with respect to said body.

2. A picker spindle structure comprising in combination, a spindle having a journal portion, a tip portion and an insert holding portion disposed between the journal portion and the tip portion, said insert holding portion comprising a conical body, said body and said tip portion being provided with a plurality of axially extending slots, the slots terminating in the tip portion in cruciform formation, a picker insert assembly disposed in said slots, said insert assembly comprising a plurality of inserts extending axially in diverging relation, said inserts including inner and outer edges, and having first and second ends, means connecting first ends of said inserts in cruciform relation, a plurality of serrations disposed along the outer edges of the inserts, the inserts being positioned in the slots with the serrations projecting outwardly from the conical body, inwardly directed projections disposed on the inner edges of the inserts adjacent their second ends, an annular groove disposed about the periphery of the spindle structure for receiving the projections, a sleeve encircling the body, said sleeve being positioned over the second ends of the inserts for engaging the inserts and for securing them in the slots against axial and lateral displacement with respect to said body.

3. A picker spindle structure comprising in combination, a spindle having a journal portion, a tip portion and an insert holding portion disposed between the journal portion and the tip portion, said insert holding portion comprising a conical body, said body and said tip portion being provided with a plurality of axially extending slots, the slots terminating in the tip portion in cruciform relation, a picker insert assembly supported on the insert holding portion, said assembly comprising a plurality of relatively thin inserts having first end portions connected adjacent the tip portion in cruciform relation and second end portions, the inserts extending in diverging relation and conforming to the conical body, said inserts including inner edge portions disposed in the axially extending slots, said inserts including outer edge portions including picker barbs projecting outwardly from the conical body, inwardly extending projections disposed on the second end portions of the inserts, said conical body including a recessed portion for receiving the inwardly extending projections, and means connected to said spindle structure for securing the inserts against lateral and axial displacement with respect to said body.

4. A picker spindle structure comprising in combination, a spindle having a journal portion, a tip portion and an insert holding portion disposed between the journal portion and the tip portion, said insert holding portion comprising a conical body, said body and said tip portion being provided with a plurality of axially extending slots, the slots terminating in the tip portion in cruciform relation, a picker insert assembly supported on the insert holding portion, said assembly comprising a plurality of inserts having end portions connected adjacent the tip portion in cruciform relation, the inserts extending in diverging relation and conforming to the conical body, said inserts including inner edge portions disposed in the axially extending slots, and outer edge portions including picker barbs projecting outwardly from the conical body.

5. A picker spindle structure comprising in combination, a spindle having a journal portion, a tip portion and an insert holding portion disposed between the journal portion and the tip portion, said insert holding portion comprising a conical body, said body and said tip portion being provided with a plurality of axially extending slots, the slots terminating in the tip portion in cruciform formation, a picker insert assembly disposed in said slots, said insert assembly comprising a plurality of inserts extending axially in diverging relation, said inserts including inner and outer edges and adjacent ends, means on said ends connecting said ends of said inserts in assembled relation, a plurality of picker barbs disposed along the outer edges of the inserts, the inner edges of said inserts being positioned in the slots with the barbs projecting outwardly from the conical body, and means connected to said spindle and engaging the inserts for securing the inserts in said slots.

6. A cotton picker spindle insert comprising a pair of leg members connected together and extending from their point of connection in substantially U-shaped relation, and a plurality of picker barbs disposed along outer edges of said leg members.

7. A cotton picker spindle insert assembly comprising an insert including a tip portion, said tip portion having a longitudinally extending slot, barbed leg members connected to the tip portion and extending longitudinally with respect thereto in diverging relation, another insert having a tip portion, and barbed legs extending longitudinally in diverging relation from the last mentioned tip portion, said inserts being connected together with the last mentioned tip portion disposed within the slot of the first mentioned tip portion in cruciform mating relation.

8. A cotton picker spindle insert assembly in accordance with claim 7, wherein the first and second inserts comprise relatively thin sheet material.

9. A cotton picker insert comprising a relatively thin metal member having leg portions connected together, the legs extending from their point of connection in relative V-shaped relation, and a plurality of cotton engaging projections on said leg portions.

AUGUST CHRISTIAN VOIGT.

References Cited in the file of this patent

UNITED STATES PATENTS

| Number | Name | Date |
|--------|------|------|
| 1,217,834 | Santmyers et al. | Feb. 27, 1917 |
| 2,508,842 | Searles | May 23, 1950 |